United States Patent
Zhu et al.

(10) Patent No.: US 8,195,394 B1
(45) Date of Patent: Jun. 5, 2012

(54) OBJECT DETECTION AND CLASSIFICATION FOR AUTONOMOUS VEHICLES

(75) Inventors: Jiajun Zhu, Sunnyvale, CA (US); Michael Steven Montemerlo, Mountain View, CA (US); Christopher Paul Urmson, Mountain View, CA (US); Andrew Chatham, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/181,999

(22) Filed: Jul. 13, 2011

(51) Int. Cl.
*G06K 9/00* (2006.01)
(52) U.S. Cl. .......................... 701/514; 382/107
(58) Field of Classification Search .................. 701/514, 701/400, 408–410, 422, 428–430, 433, 437, 701/468, 444, 446, 458, 461, 469, 523; 340/435, 340/904, 988, 995.14, 995.17–995.19, 995.22, 340/995.24, 995.25; 348/113, 116, 118, 348/119, 142, 135, 148, 149; 382/103, 104, 382/107
See application file for complete search history.

(56) References Cited

U.S. PATENT DOCUMENTS

| | | | |
|---|---|---|---|
| 5,170,352 A | 12/1992 | McTamaney et al. | |
| 5,229,941 A | 7/1993 | Hattori | |
| 6,151,539 A | 11/2000 | Bergholz et al. | |
| 6,188,957 B1 | 2/2001 | Bechtolsheim et al. | |
| 6,285,393 B1 * | 9/2001 | Shimoura et al. | 348/119 |
| 7,072,764 B2 | 7/2006 | Donath et al. | |
| 7,418,346 B2 | 8/2008 | Breed et al. | |
| 7,957,559 B2 * | 6/2011 | Shima et al. | 382/104 |
| 2001/0027375 A1 * | 10/2001 | Machida et al. | 701/209 |
| 2005/0149251 A1 | 7/2005 | Donath et al. | |
| 2007/0288133 A1 | 12/2007 | Nishira et al. | |
| 2008/0161987 A1 | 7/2008 | Breed | |
| 2008/0162027 A1 | 7/2008 | Murphy et al. | |
| 2009/0228204 A1 | 9/2009 | Zavoli et al. | |
| 2009/0306881 A1 | 12/2009 | Dolgov et al. | |
| 2010/0114416 A1 | 5/2010 | Au et al. | |
| 2010/0182432 A1 | 7/2010 | Augst | |
| 2010/0256836 A1 | 10/2010 | Mudalige | |
| 2011/0032119 A1 | 2/2011 | Pfeiffer et al. | |

OTHER PUBLICATIONS

Chris Scrapper, Ayako Takeuchi, Tommy Chang, Tsai Hong, Michael Shneier, Using a Priori Data for Prediction and Object Recognition in an Autonomous Mobile Vehicle, Apr. 21-25, 2003, 5 pages.

Jorn Knaup and Kai Homeier, RoadGraph—Graph Based Environmental Modelling and Function Independent Situation Analysis for Driver Assistance Systems, Sep. 19-22, 2010, 5 pages.

* cited by examiner

*Primary Examiner* — Dalena Tran
(74) *Attorney, Agent, or Firm* — Lerner, David, Littenberg, Krumholz & Mentlik, LLP

(57) ABSTRACT

Aspects of the disclosure relate generally to safe and effective use of autonomous vehicles. More specifically, objects detected in a vehicle's surroundings may be detected by the vehicle's various sensors and identified based on their relative location in a roadgraph. The roadgraph may include a graph network of information such as roads, lanes, intersections, and the connections between these features. The roadgraph may also include the boundaries of areas, including for example, crosswalks or bicycle lanes. In one example, an object detected in a location corresponding to a crosswalk area of the roadgraph may be identified as a person. In another example, an object detected in a location corresponding to a bicycle area of the roadgraph and identified as a bicycle. By identifying the type of object in this way, an autonomous vehicle may be better prepared to react to or simply avoid the object.

20 Claims, 10 Drawing Sheets

OBJECT DETECTION AND CLASSIFICATION FOR AUTONOMOUS VEHICLES

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

These vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build 3D models of the objects detected in the vehicle's surrounding. However, once an object is detected by an autonomous vehicle, identifying what the object actually is (car, building, person, other vehicle, etc.) can be very difficult.

For example, pedestrians may be difficult to differentiate from small vehicles or bicyclists. In order to identify these objects in real time, the vehicle's computer is trained, for example by collecting and providing numerous images of pedestrians and using machine learning techniques, in order to enable the computer to identify similar shapes as pedestrians. This may require a significant amount of resources, both to collect the images and to process the data.

SUMMARY

One aspect of the disclosure provides a method for identifying an object. The method includes determining a current location of a vehicle; accessing roadgraph data based on the current location of the vehicle, the roadgraph data including information about a roadway including one or more tagged areas of the roadway; collecting information about the vehicle's surroundings using an object detection device; detecting a moving object and a geographic location of the moving object based on the collected information; comparing, by a processor, the geographic location of the moving object to the roadgraph data; and identifying, by the processor, a type of the moving object based on whether the geographic location of the moving object corresponds to a tagged area of the roadgraph.

In one example, determining the current location of the vehicle includes receiving data from a geographic position component; identifying map information based on the received data; and correcting the current location of the vehicle based on the identified map information. In another example, the object detection device includes a laser configured to collect range and intensity data and the range and intensity data is used to detect the moving object and the location of the moving object. In another example, the corresponding tagged area of the roadgraph is a crosswalk and the identified type of the moving object is a pedestrian. In another example, a tag of the corresponding tagged area of the roadgraph identifies the corresponding tagged area as a crosswalk. In another example, the corresponding tagged area of the roadgraph is a crosswalk and the identified type of the moving object is a bicyclist. In another example, a tag of the corresponding tagged area of the roadgraph identifies the corresponding tagged area as a bicycle lane. In another example, the method also includes the processor causing the vehicle to maintain a minimum distance between the vehicle and the moving object based on the identification of the moving object. In another example, the vehicle is an autonomous vehicle and the method further comprises maneuvering the autonomous vehicle along the roadway, by the processor, without input from a human driver. In another example, the roadgraph graphically stores features of the roadway and relationships of the features of the roadway. In another example, the method also includes, if the moving object is not within a corresponding tagged area of the roadgraph, using at least one image matching technique to identify the type of the moving object.

Another aspect of the disclosure provides a device for identifying an object. The device includes memory storing roadgraph data including information about a roadway including one or more tagged areas of the roadway; an object detection device for collecting information about the device's surroundings; and a processor coupled to the memory and the object detection device. The processor is operable to maneuver a vehicle along a roadway; determine a current location of the vehicle; access the roadgraph data based on the current location of the vehicle; receive collected information from the object detection device; detect a moving object and a location of the moving object based on the collected information; compare the location of the moving object to the roadgraph data; and identify a type of the moving object based on whether the location of the moving object corresponds to a tagged area of the roadgraph.

In one example, the corresponding tagged area of the roadgraph is a crosswalk and the identified type of the moving object is a pedestrian. In another example, the corresponding tagged area of the roadgraph is a bicycle lane and the identified type of the moving object is a bicycle. In another example, the processor is further operable to maintain a minimum distance between the vehicle and the moving object based on the identification of the moving object. In another example, the processor is also operable to, if the moving object is not within a corresponding tagged area of the roadgraph, identify the type of the moving object using at least one image matching technique.

Yet another aspect of the disclosure provides a tangible, non-transitory, computer-readable storage medium on which computer readable instructions of a program are stored, the instructions, when executed by a processor, cause the processor to perform a method of identifying an object. The method includes maneuvering a vehicle along a roadway; determining a current location of the vehicle; accessing roadgraph data based on the current location of the vehicle, the roadgraph data including information about the roadway including one or more tagged areas of the roadway; collecting information about the vehicle's surroundings using an object detection device; detecting a moving object and a location of the moving object based on the collected information; comparing the location of the moving object to the roadgraph data; and identifying a type of the moving object based on whether the location of the moving object corresponds to a tagged area of the roadgraph.

In one example, the corresponding tagged area of the roadgraph is a crosswalk and the identified type of the moving object is a pedestrian. In another example, the corresponding tagged area of the roadgraph is a bicycle lane and the identified type of the moving object is a bicycle. In another example, the method also includes, if the moving object is not within a corresponding tagged area of the roadgraph, using at least one image matching technique to identify the type of the moving object.

DETAILED DESCRIPTION

In one aspect, a computer accesses roadgraph information for a geographic location. As described in more detail below, the roadgraph data may include a graph network of information such as roads, lanes, intersections, and the connections between these features. This roadgraph data may be collected, for example by mounting a laser or other object detection component to a vehicle and driving the vehicle along a roadway. The roadgraph data may be processed to identify one or more areas where people are likely to be not in another vehicle, such as designated pedestrian or bicycle areas. The one or more areas may be associated with identifiers. All or some of the roadgraph data, including the area identifiers, may be transmitted or downloaded to a vehicle's autonomous driving computer.

The autonomous driving computer may receive the roadgraph data and the area identifiers. This data may be stored in memory accessible by the vehicle's computer. While in an autonomous mode, the vehicle may approach a geographic location. The vehicle's object detection devices, such as a laser, may detect data for the particular location. Based on this detected data, the vehicle's computer may identify a moving object and the moving object's location. The vehicle's computer may then compare the location of the moving object to the roadgraph data. If the moving object is located within an area of the roadgraph associated with an identifier, the vehicle's computer may identify the moving object based on the area identifier. For example, the moving object may be identified as a pedestrian if the area identifier identifies a crosswalk. In another example, the moving object may be identified as a bicycle if the area identifier identifies a bicycle lane. Again, as described above, once the moving object has been identified, the vehicle may take some action in response to the object if necessary.

If the moving object is not located within an area identifier of the roadgraph, the vehicle's computer may attempt to use image matching or other techniques to identify the moving object.

Figure 1:
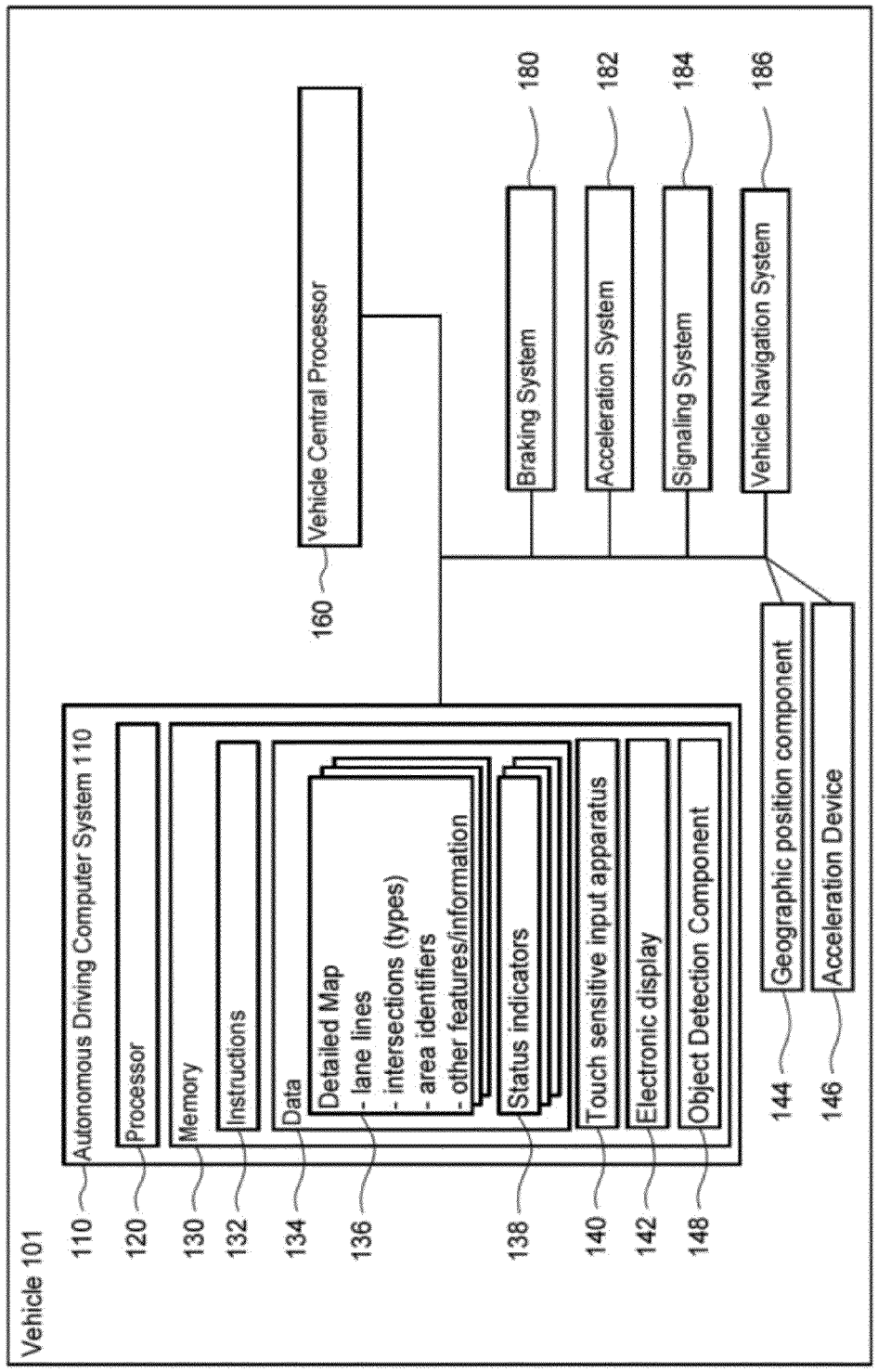
FIG. 1 is a functional diagram of a system in accordance with an exemplary embodiment.

As shown in FIG. 1, an autonomous driving system 100 in accordance with one exemplary embodiment includes a vehicle 101 with various components. While certain aspects of embodiments described herein are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, farm equipment, construction equipment, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although aspects of the claimed subject matter are not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available processors. Alternatively, the processor may be a dedicated device such as an ASIC or other hardware-based processing device. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer or memory will be understood to include references to a collection of processors, computers, or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

Figure 2:
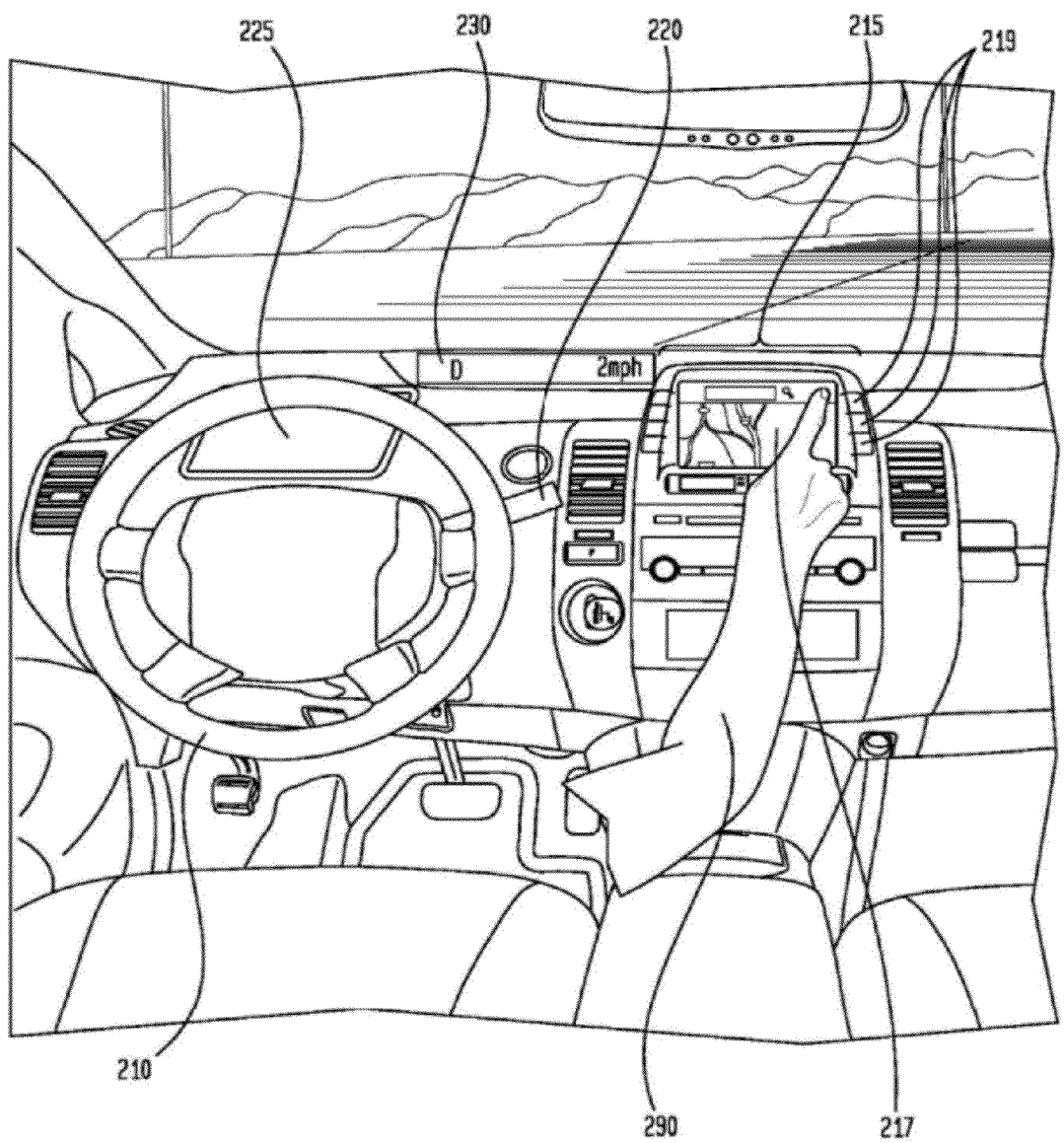
FIG. 2 is a design of the interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The lasers may include commercially available lasers such as the Velodyne HDL-64 or other models.

The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors may allow the vehicle to understand and potentially respond to its environment in order to maximize safety for passengers as well as objects or people in the environment.

In addition to the sensors described above, the computer may also use input from sensors typical in non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3:
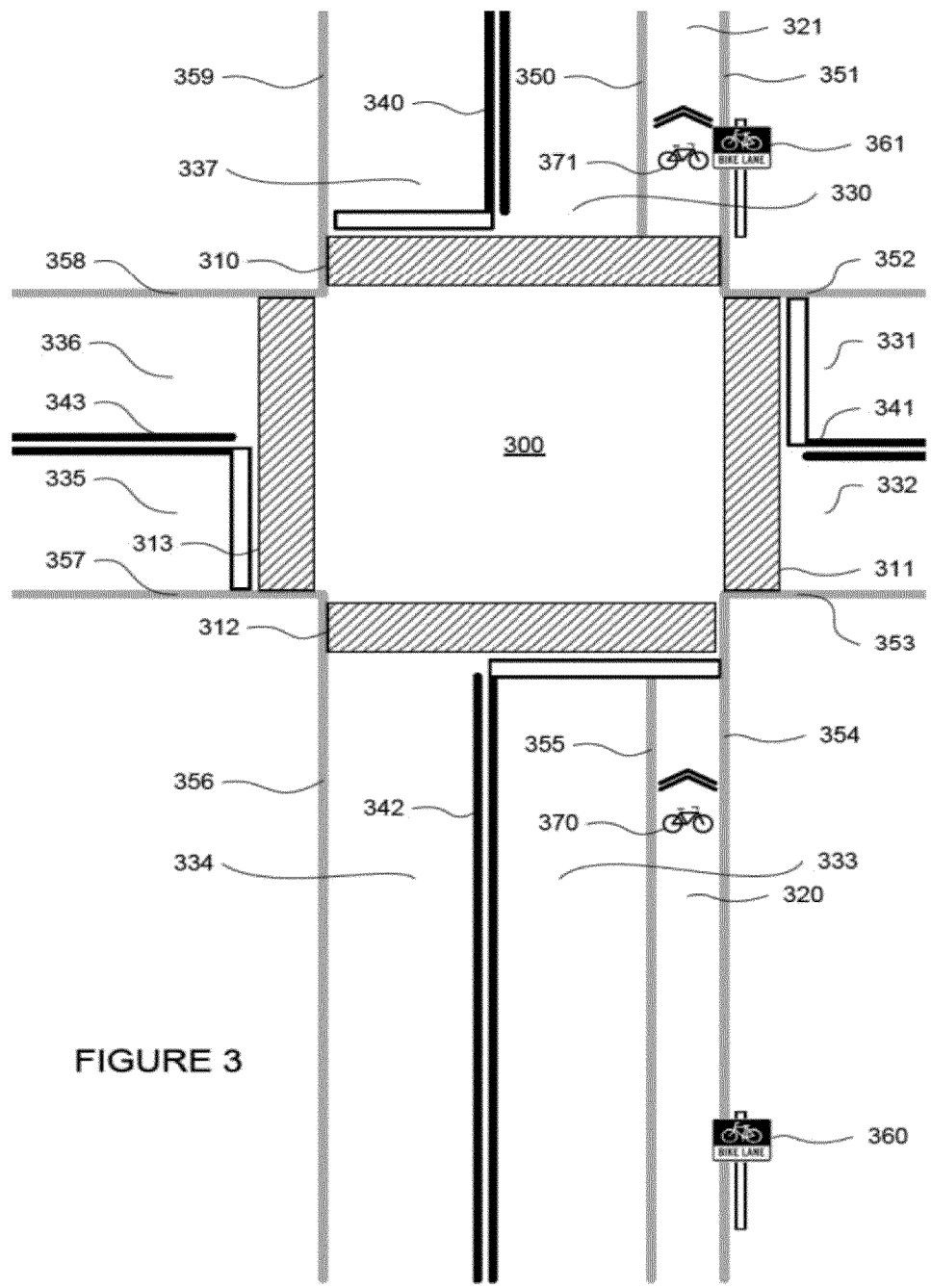
FIG. 3 is a birds-eye view of an intersection in accordance with an exemplary embodiment.

FIG. 3 depicts a birds-eye view of an exemplary intersection 300 which may be the subject of detailed map 146. The intersection may include a number of different features such as crosswalks 310-313, bicycle lanes 320-321, lanes 330-337, lane lines 340-343 and 350-359. Intersection may also include indicators such as signs 350-351 and 360-361 identifying specific areas such as bicycle lanes 320-321. Other features such as traffic signals or stop signs may also be present, but are not shown.

Although intersection 300 includes four roadways meeting perpendicular to one another, various other intersection configurations, may also be employed. It will be further understood that aspects described herein are not limited to intersections, but may be utilized in conjunction with various other traffic or roadway designs which may or may not include additional features or all of the features described with respect to intersection 300.

Figure 4:
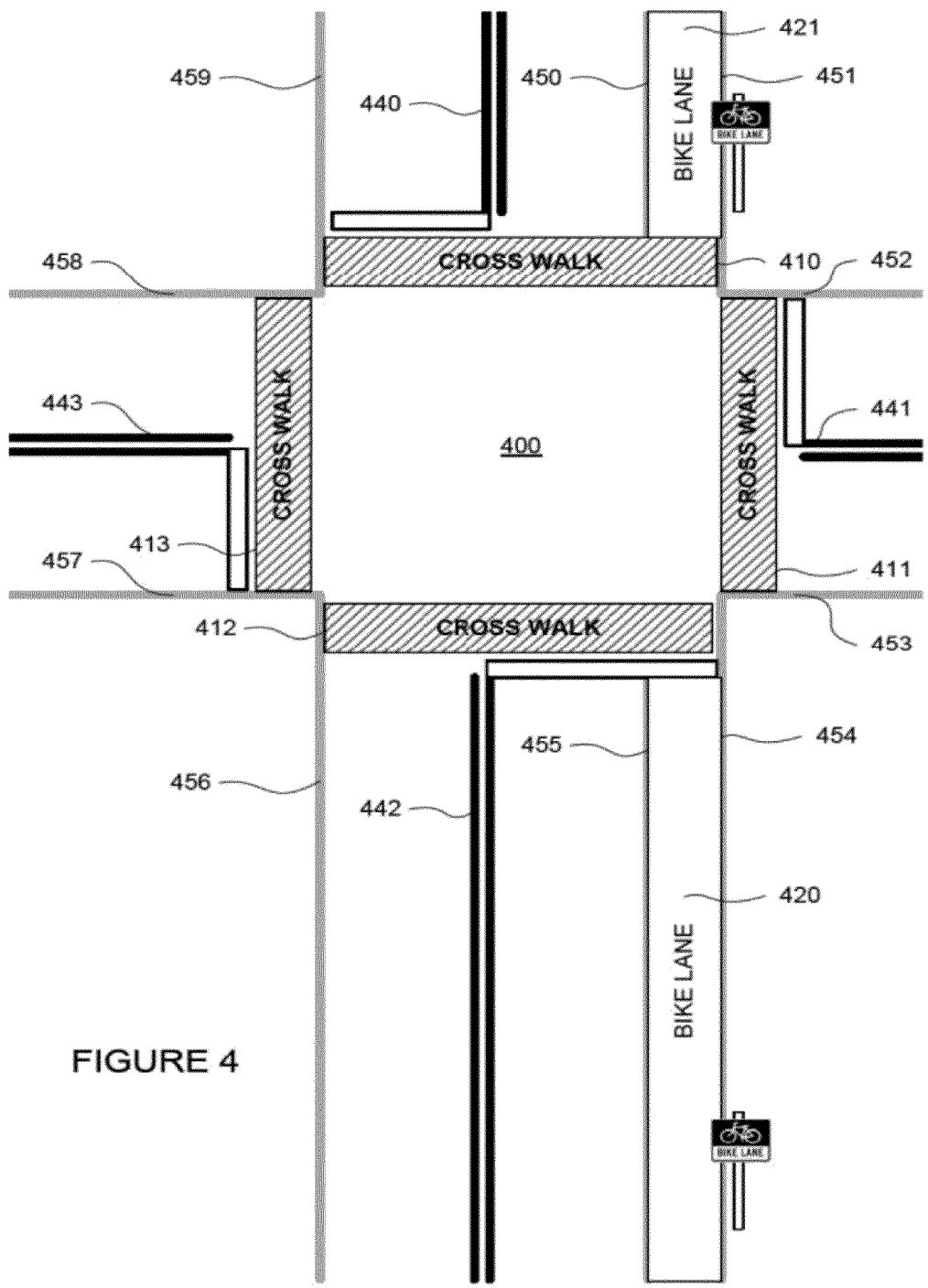
FIG. 4 is a roadgraph in accordance with an exemplary embodiment.

Data about the intersection (or other portions of the roadway) may be collected, for example, by driving a vehicle equipped various object detection components. The data may be processed in order to generate roadgraph information describing the roadway. For example, as shown in FIG. 4, based on laser, geographic location, and other information collected while driving a vehicle through intersection 300, a roadgraph 400 of the intersection may be generated. Similar to intersection 300, roadgraph 400 may include various features such as lanes 430-437, lane lines 440-443 and 450-459. Each of these features may be associated with geographic location information identifying where these objects may be located in the real world (for example in intersection 300). Again, although roadgraph 400 is depicted as an image-based map, it will be understood that this information may be stored as a graph network or grid of data or other information describing the various features and their relationships.

The roadgraph may also include annotations, tags, or other indicators identifying or classifying particular areas of the roadgraph. For example, the roadgraph may include tags that identify areas of the roadway which are known to be generally occupied by persons not in another vehicle such as pedestrians or bicyclists. The identifiers may be generated manually by people when constructing the roadgraph. The identifiers may also be constructed automatically by analyzing laser data from repeated passes through the same area, or by optical character (and symbol) recognition on camera images and/or laser data.

Returning to FIG. 4, roadgraph may include crosswalk identifiers 410-413 and bicycle lane identifiers 420-421. These identifiers may define the geographic boundaries of these areas in the roadgraph. As will be described in more detail below, this information may be downloaded to or transmitted to an autonomous vehicle's computer and stored in memory to be used to identify and react, if necessary, to various objects.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
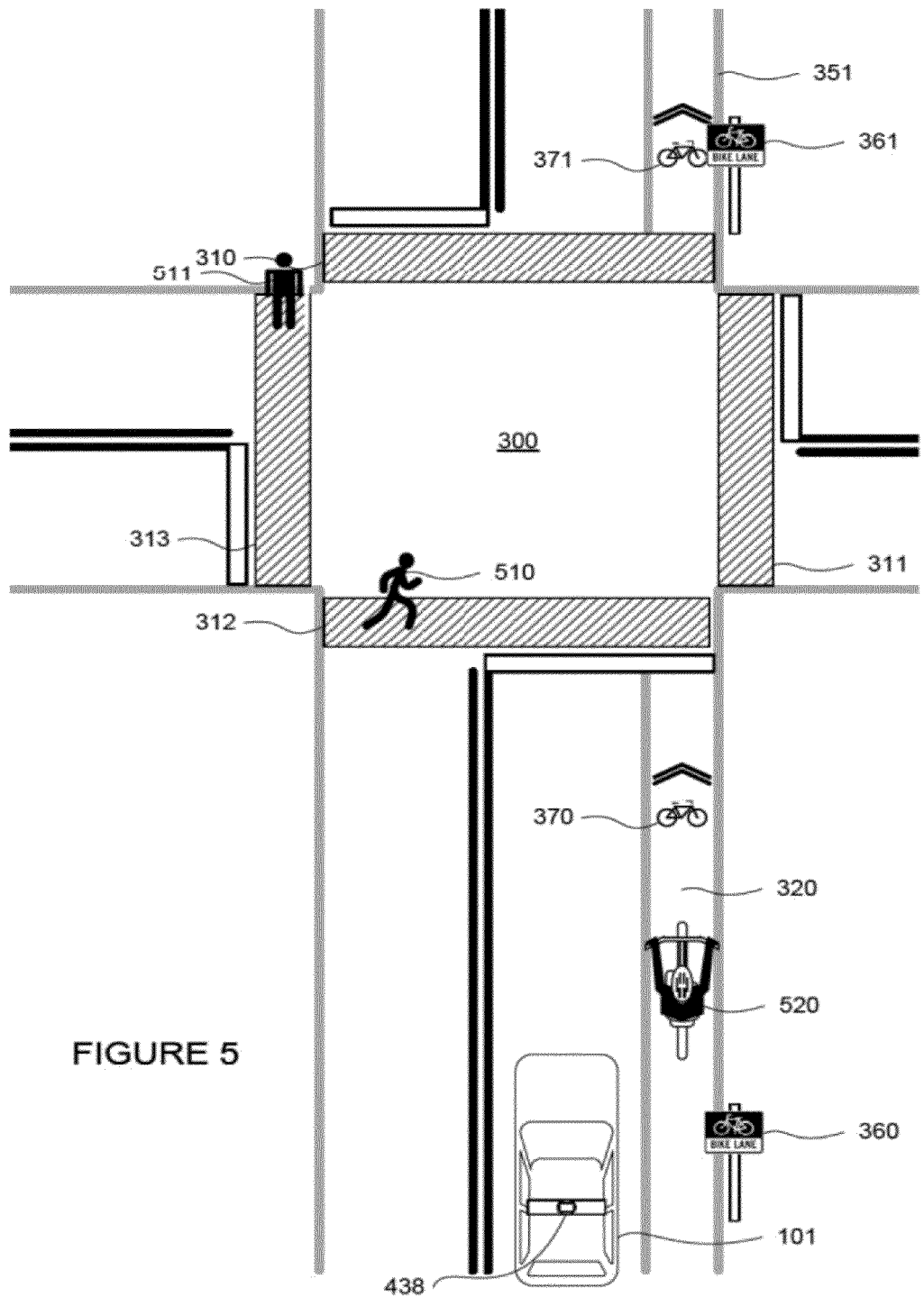
FIG. 5 is a birds-eye view of an intersection in accordance with an exemplary embodiment.

FIG. 5 is another birds-eye view of intersection 300 while autonomous vehicle 101 is approaching. Here intersection 300 now also includes pedestrians 510-511 as well as a bicyclist 520. Pedestrians 510 and 511 are located within crosswalks 312 and 313, respectively, while bicyclist is located within bicycle lane 320.

As vehicle 101 approaches an intersection in an autonomous driving mode, it may use its various components to detect the vehicle's location as well as objects external to the vehicle. For example, vehicle 101 may use data from the geographic position component to identify location coordinates or an address associated with the current location of the vehicle. The vehicle's autonomous driving computer may then access roadgraph data corresponding to this location.

Figure 6:
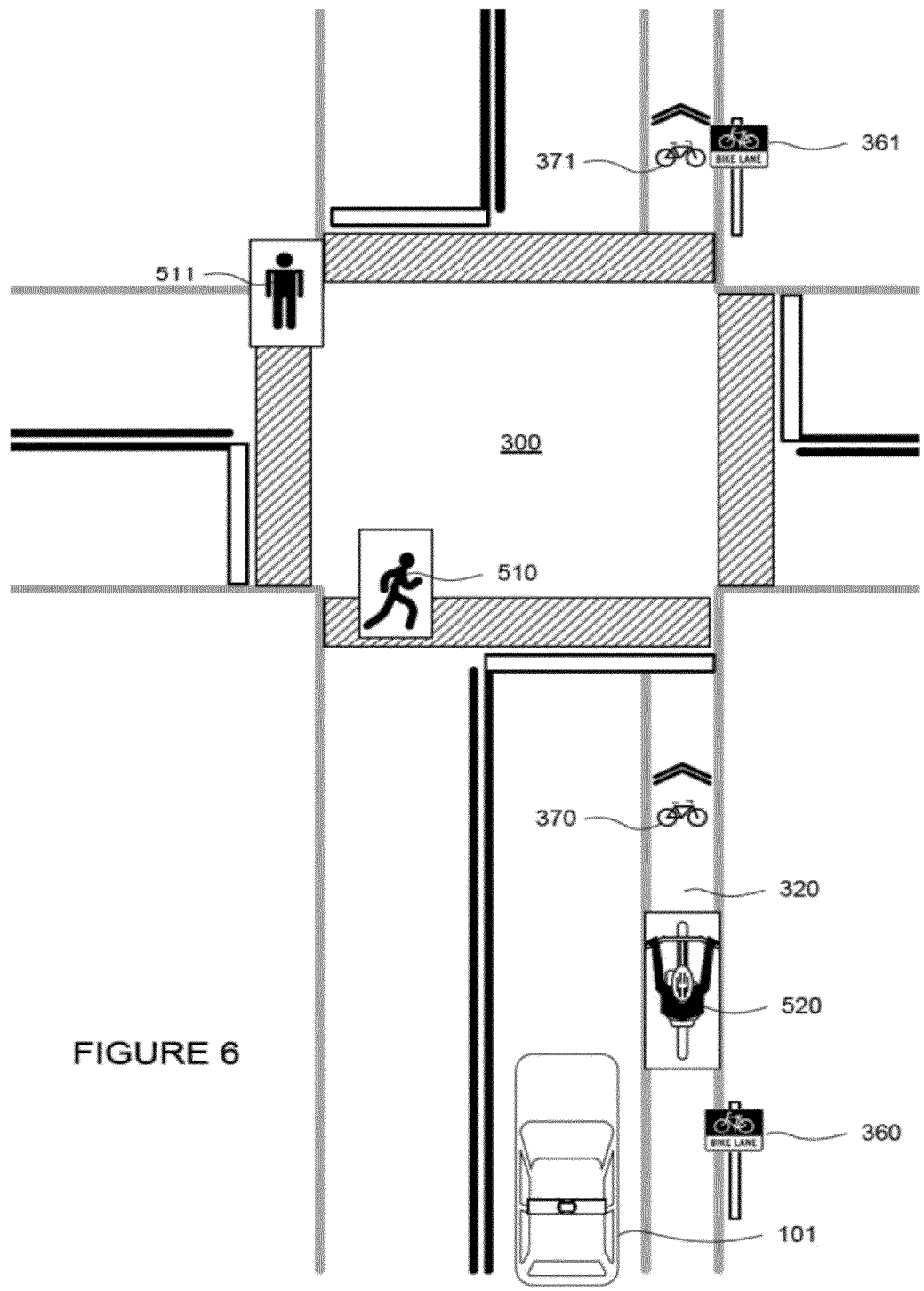
FIG. 6 depicts sensor data in accordance with an exemplary embodiment.

The vehicle's computer may use data from object detection components such as laser 438 to detect objects in the vehicle's surroundings. As the laser moves along, it may collect range (distance) and intensity information for the same location (point or area) from several directions and/or at different times. FIG. 6 depicts an exemplary display 600 of laser data collected as the vehicle approaches intersection 300. For example the vehicle may be able to detect lane lines 340-343 and 350-359 and signs 360-361 as well as their locations relative to the current location of the vehicle. This relative location information may be used to identify an actual location of the object. In some examples, the computer may use the roadgraph and data from laser 438 to increase the accuracy of the current location of the vehicle, for example by comparing lane lines 340-343 and 350-359 of intersection 300 to lane lines 440-443 and 450-459 of roadgraph 400, etc.

In addition to detecting fixed objects, the computer may also detect the existence and geographic location of moving objects. The computer may determine whether an object is moving or not based on the vehicle's own speed and acceleration, etc., and the data received from the laser. For example, as shown in FIG. 6, the laser data may be used to detect objects 610, 611, and 620, corresponding to the pedestrians and bicyclist of FIG. 5, as well as their locations relative to the current location of the vehicle. This relative location information may be used to identify an actual location of the object. After some short period of time where the bicyclist and pedestrians have moved, computer 110 may determine that these features are moving based on a change in their location relative to intersection 300.

Once the various objects in the vehicle's surroundings have been detected, they may be compared to the roadgraph in order to identify what the objects are. For example, the computer may identify lane lines 340-343 and 350-359 from the laser data as lane lines 440-443 and 450-459 of the roadgraph. However, objects 610, 611, and 620 will not appear on the roadgraph as they are not static objects expected to reappear each time the autonomous vehicle drives through intersection 300.

Figure 7:
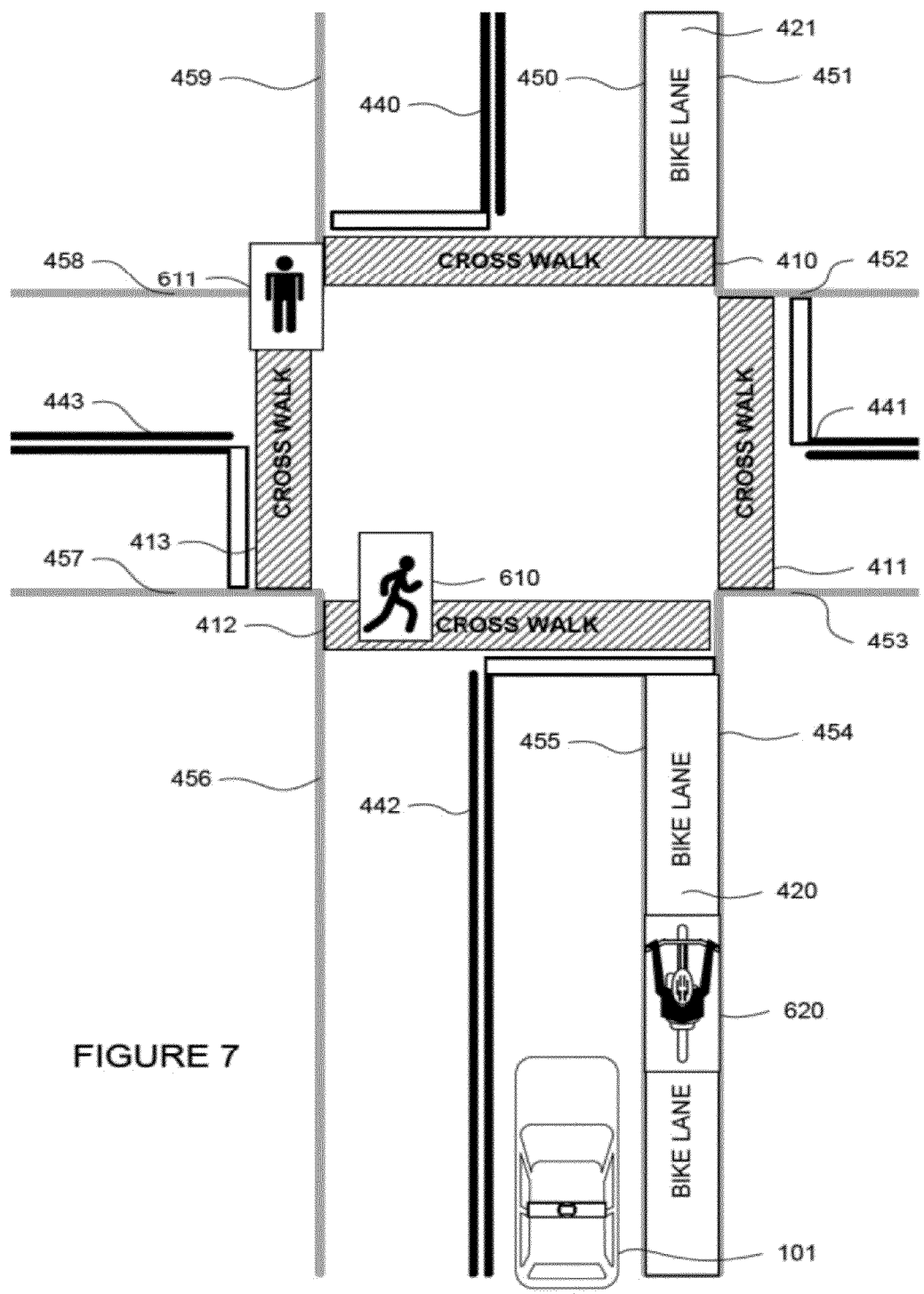
FIG. 7 depicts sensor data in accordance with an exemplary embodiment.

These moving (or non-static) objects may also be compared to the roadgraph data for identification. Objects which are located completely or partly within a pre-defined area of the roadgraph may be identified based on the area identifier. For example, as shown in of FIG. 7, the geographic locations of objects 610, 611, and 620 may be compared to the corresponding geographic locations in roadgraph 400. As can be seen from FIG. 7, objects 610 and 611 appear within crosswalks 412 and 413, respectively. Accordingly, objects 610 and 611 may be identified by the computer as pedestrians based on their location in the crosswalk identifiers. Similarly, object 620 appears within bike lane 420, and the computer may identify object 620 as a bicyclist based on its location in the bicycle lane identifier.

Not every object observed in the pre-defined areas will necessarily be a pedestrian (or bicyclist). For example, other vehicles (e.g. scooters, cars, trucks) may also pass through crosswalks or move into bicycle lanes. In this regard, the identifier associated with a pre-defined area may be a hint or indication that objects in these areas may be more likely to be pedestrians or bicyclists. For example, an autonomous vehicle's computer may consider a variety of sensor data and map data which may indicate a moving object's type. These indications may include laser point cloud density, surface normal distribution, object height, object radius, camera image color, object shape, object moving speed, object motion in the past N seconds, etc. The computer may then consider the object's type based on the sum of these indications, for example, by using a machine learning algorithm which classifies the type of object. In one example, the machine learning algorithm may include various decision trees. The pre-defined regions may therefore allow the computer to identify certain objects, such as pedestrians and bicyclists, faster.

If the moving object cannot be identified based on the area identifiers, other identification methods may be used. For example, image and pattern matching techniques involving comparing one or more images (or laser data) of the moving object to a set of pre-identified images (or laser data), may be used to identify the moving object.

Once the moving objects have been identified, the computer may use this information to control the autonomous vehicle. The computer may operate the vehicle in order to avoid injury to nearby people or the vehicle by maintaining a safe minimum distance, for example several yards, from pedestrians or bicyclists while the vehicle is moving. For example, a vehicle may stop where a pedestrian is identified in a crosswalk in front of the vehicle, or the vehicle may not pass a bicyclist unless the vehicle is able to maintain the minimal distance. In another example, the type of action may be based on the mode of the autonomous vehicle, or rather the level of autonomy, such as where a driver in the vehicle is still required to steer the vehicle, it may slow down dramatically or stops to avoid a pedestrian or bicyclist.

Figure 8:
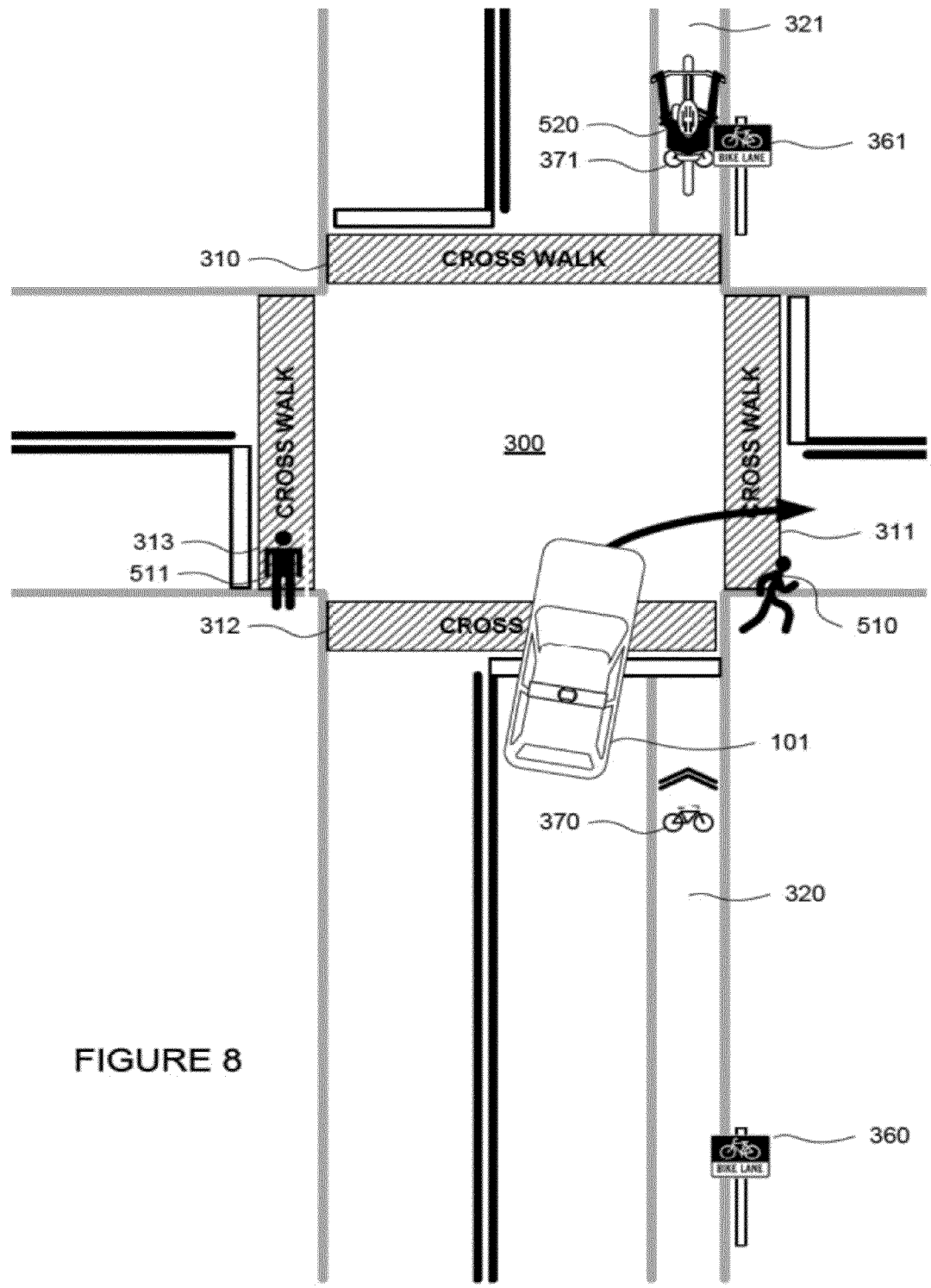
FIG. 8 is a birds-eye view of an intersection in accordance with an exemplary embodiment.
Figure 9:
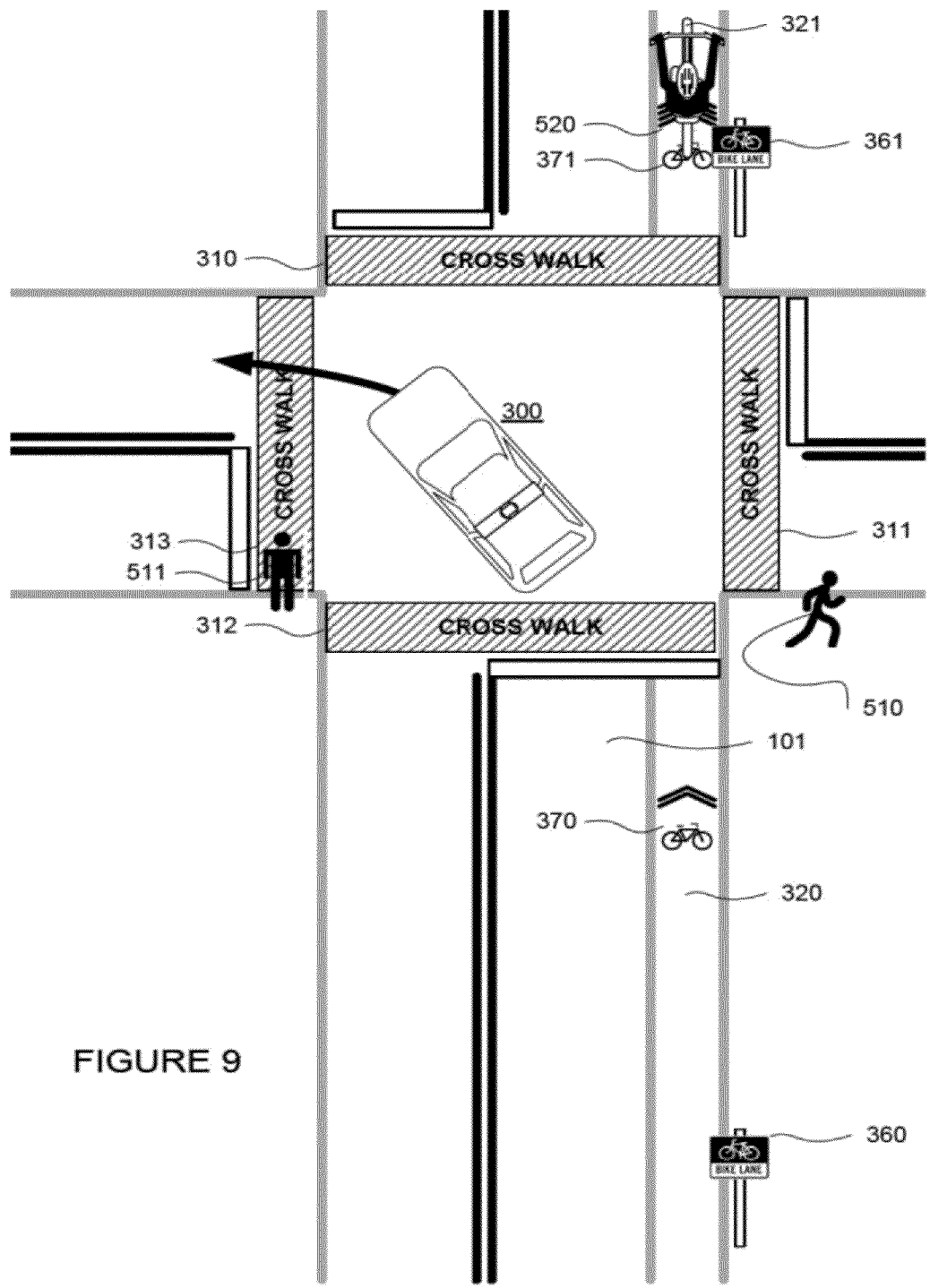
FIG. 9 is a birds-eye view of an intersection in accordance with an exemplary embodiment.

In one example, shown in intersection 300 of FIG. 8, vehicle 101 is making a right turn. The computer may require that before the vehicle makes this turn, pedestrian 510 must have cleared the crosswalk and/or the roadway. The computer may also require that bicyclist 520 exit the intersection before the vehicle turns. In another example, as shown in intersection 300 of FIG. 9, vehicle 101 is making a left turn. The computer may require that before the vehicle makes this turn, both pedestrians 510 and 511 must have cleared the crosswalks and/or the roadway. The computer may also require that bicyclist 520 exit the intersection before the vehicle turns.

Figure 10:
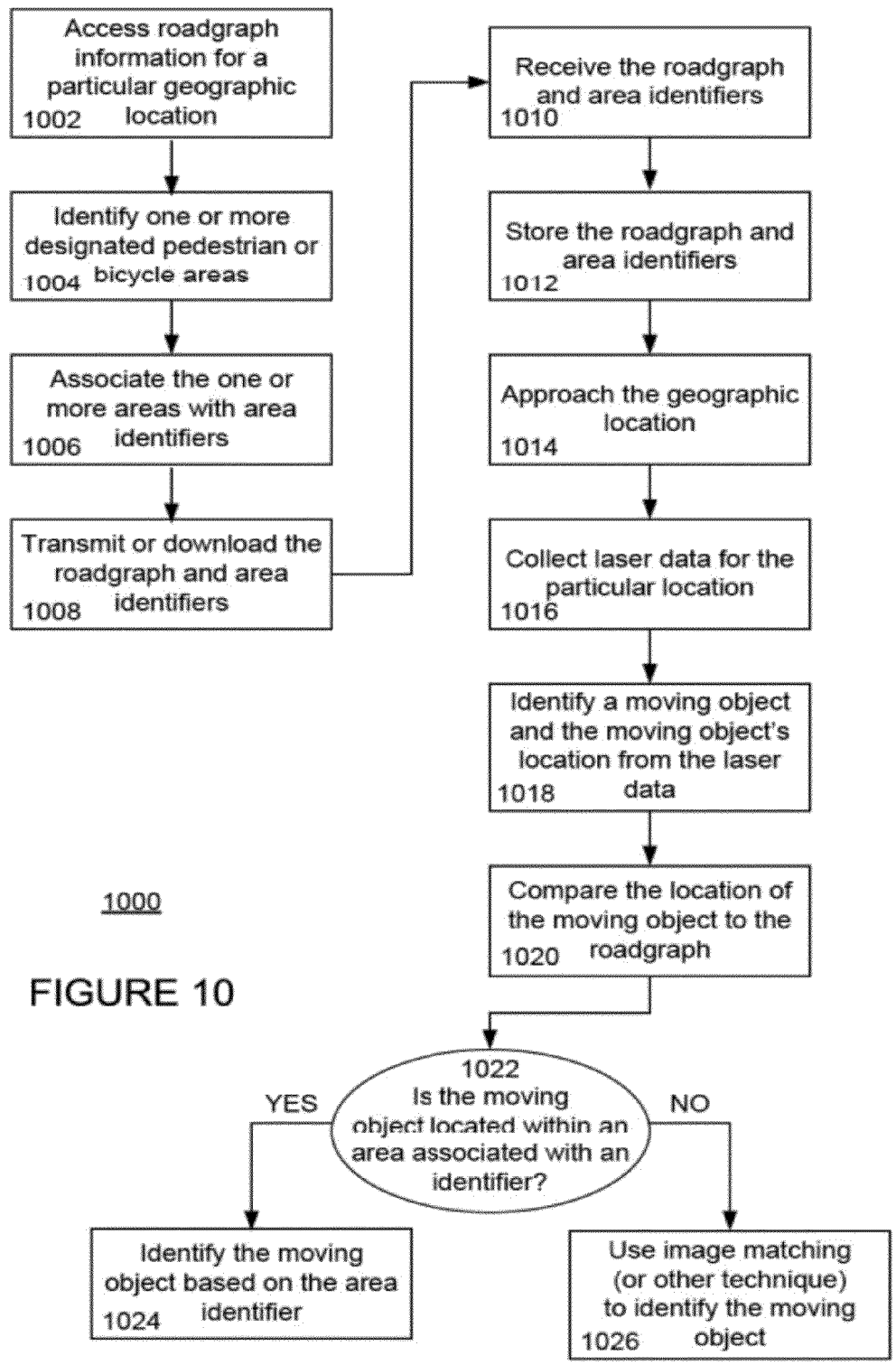
FIG. 10 is a flow diagram in accordance with an exemplary embodiment.

Exemplary flow diagram 1000 of FIG. 10 depicts aspects of the processes described above. For example, a computer accesses roadgraph information for a geographic location at block 1002. This roadgraph data may be collected, for example by mounting a laser or other object detection component to a vehicle and driving the vehicle along a roadway. At block 1004, the roadgraph data is then processed to identify one or more areas where people are likely to be not in another vehicle, such as designated pedestrian or bicycle areas. For example, the areas may be identified manually by people or by optical character (and symbol) recognition on camera images and/or laser data.

The one or more areas are then associated with identifiers at block 1006. All or some of the roadgraph data, including the area identifiers, is transmitted or downloaded to a vehicle's autonomous driving computer at block 1008.

The autonomous driving computer receives the roadgraph data and the area identifiers at block 1010. This data is stored in memory accessible by the vehicle's computer at block 1012. While in an autonomous mode, the vehicle approaches a geographic location at block 1014. The vehicle's object detection devices, such as a laser, detect data for the particular location at block 1016. Based on this detected data, the vehicle's computer identifies a moving object and the moving object's location at block 1018. The vehicle's computer then compares the location of the moving object to the roadgraph at block 1022. If the moving object is located within an area of the roadgraph associated with an area identifier at block 1022, the vehicle's computer identifies the moving object based on the area identifier at block 1024. For example, the moving object may be identified as a pedestrian if the area identifier identifies a crosswalk. In another example, the moving object may be identified as a bicycle if the area identifier identifies a bicycle lane. Again, as described above, once the moving object has been identified, the vehicle may take some action in response to the object if necessary.

Returning to block 1022, if the moving object is not located within an area of the roadgraph associated with an identifier at block 1026, the vehicle's computer may attempt to use image matching or other techniques to identify the moving object.

As these and other variations and combinations of the features discussed above can be utilized without departing from the subject matter defined by the claims, the foregoing description of exemplary embodiments should be taken by way of illustration rather than by way of limitation of the claimed subject matter. It will also be understood that the provision of examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for identifying an object, the method comprising:
   determining a current location of a vehicle;
   accessing roadgraph data based on the current location of the vehicle, the roadgraph data including information about a roadway including one or more tagged areas of the roadway;
   collecting information about the vehicle's surroundings using an object detection device;
   detecting a moving object and a geographic location of the moving object based on the collected information;
   comparing, by a processor, the geographic location of the moving object to the roadgraph data; and
   identifying, by the processor, a type of the moving object based on whether the geographic location of the moving object corresponds to a tagged area of the roadgraph.

2. The method of claim 1, wherein determining the current location of the vehicle comprises:
   receiving data from a geographic position component;
   identifying map information based on the received data; and
   correcting the current location of the vehicle based on the identified map information.

3. The method of claim 1, wherein:
   the object detection device includes a laser configured to collect range and intensity data; and
   the range and intensity data is used to detect the moving object and the location of the moving object.

4. The method of claim 1, wherein the corresponding tagged area of the roadgraph is a crosswalk and the identified type of the moving object is a pedestrian.

5. The method of claim 1, wherein a tag of the corresponding tagged area of the roadgraph identifies the corresponding tagged area as a crosswalk.

6. The method of claim 1, wherein the corresponding tagged area of the roadgraph is a crosswalk and the identified type of the moving object is a bicyclist.

7. The method of claim 1, wherein a tag of the corresponding tagged area of the roadgraph identifies the corresponding tagged area as a bicycle lane.

8. The method of claim 1, further comprising the processor causing the vehicle to maintain a minimum distance between the vehicle and the moving object based on the identification of the moving object.

9. The method of claim 1, wherein the vehicle is an autonomous vehicle and the method further comprises maneuvering the autonomous vehicle along the roadway, by the processor, without input from a human driver.

10. The method of claim 1, wherein the roadgraph graphically stores features of the roadway and relationships of the features of the roadway.

11. The method of claim 1, further comprising, if the moving object is not within a corresponding tagged area of the roadway, using at least one image matching technique to identify the type of the moving object.

12. A device for identifying an object, the device comprising:
   memory storing roadgraph data including information about a roadway including one or more tagged areas of the roadway;
   an object detection device for collecting information about the device's surroundings;
   a processor coupled to the memory and the object detection device, the processor being operable to:
     maneuver a vehicle along a roadway;
     determine a current location of the vehicle;
     access the roadgraph data based on the current location of the vehicle;
     receive collected information from the object detection device;
     detect a moving object and a location of the moving object based on the collected information;
     compare the location of the moving object to the roadgraph data; and
     identify a type of the moving object based on whether the location of the moving object corresponds to a tagged area of the roadgraph.

13. The device of claim 12, wherein the corresponding tagged area of the roadgraph is a crosswalk and the identified type of the moving object is a pedestrian.

14. The device of claim 12, wherein the corresponding tagged area of the roadgraph is a bicycle lane and the identified type of the moving object is a bicycle.

15. The device of claim 12, wherein the processor is further operable to maintain a minimum distance between the vehicle and the moving object based on the identification of the moving object.

16. The device of claim 12, wherein the processor is further operable to, if the moving object is not within a corresponding tagged area of the roadgraph, identify the type of the moving object using at least one image matching technique.

17. A tangible, non-transitory, computer-readable storage medium on which computer readable instructions of a program are stored, the instructions, when executed by a processor, cause the processor to perform a method of identifying an object, the method comprising:
   maneuvering a vehicle along a roadway;
   determining a current location of the vehicle;
   accessing roadgraph data based on the current location of the vehicle, the roadgraph data including information about the roadway including one or more tagged areas of the roadway;
   collecting information about the vehicle's surroundings using an object detection device;
   detecting a moving object and a location of the moving object based on the collected information;
   comparing the location of the moving object to the roadgraph data; and
   identifying a type of the moving object based on whether the location of the moving object corresponds to a tagged area of the roadgraph.

18. The tangible, non-transitory, computer-readable storage medium of claim 17, wherein the corresponding tagged area of the roadgraph is a crosswalk and the identified type of the moving object is a pedestrian.

19. The tangible, non-transitory, computer-readable storage medium of claim 17, wherein the corresponding tagged area of the roadgraph is a bicycle lane and the identified type of the moving object is a bicycle.

20. The tangible, non-transitory, computer-readable storage medium of claim 17, wherein the method further comprises, if the moving object is not within a corresponding tagged area of the roadgraph, using at least one image matching technique to identify the type of the moving object.

* * * * *